(12) United States Patent
Lee et al.

(10) Patent No.: US 12,177,047 B2
(45) Date of Patent: Dec. 24, 2024

(54) METHOD AND APPARATUS FOR COMPENSATING IQ IMBALANCE

(71) Applicant: ELECTRONICS AND TELECOMMUNICATIONS RESEARCH INSTITUTE, Daejeon (KR)

(72) Inventors: Won Kyoung Lee, Daejeon (KR); Sang Rok Moon, Daejeon (KR); Joon Ki Lee, Sejong-si (KR); Seung-Hyun Cho, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 30 days.

(21) Appl. No.: 18/111,275

(22) Filed: Feb. 17, 2023

(65) Prior Publication Data

US 2023/0318890 A1    Oct. 5, 2023

(30) Foreign Application Priority Data

Mar. 29, 2022    (KR) .................. 10-2022-0038633

(51) Int. Cl.
*H04L 7/04*    (2006.01)
*H04L 7/00*    (2006.01)
*H04L 27/20*    (2006.01)

(52) U.S. Cl.
CPC ............ *H04L 27/20* (2013.01); *H04L 7/0008* (2013.01)

(58) Field of Classification Search
CPC ... H04L 27/20; H04L 7/0008; H04L 27/3863; H04L 25/08; H04B 10/90; H04B 2210/006; H04B 1/12; H03D 3/009
USPC ........................................................ 375/362
See application file for complete search history.

(56) References Cited

U.S. PATENT DOCUMENTS

| | | | |
|---|---|---|---|
| 7,310,387 B2 | 12/2007 | Kim et al. | |
| 7,804,915 B2 * | 9/2010 | Huang | H04L 27/364 375/295 |
| 7,830,954 B2 * | 11/2010 | Welz | H04B 1/30 455/67.14 |
| 8,526,518 B2 | 9/2013 | Feigin et al. | |
| 8,565,352 B2 | 10/2013 | Park et al. | |
| 8,681,885 B2 | 2/2014 | Chung et al. | |
| 9,042,483 B2 | 5/2015 | Joung et al. | |
| 11,115,086 B1 * | 9/2021 | Berliner | H04L 27/0014 |

FOREIGN PATENT DOCUMENTS

KR    10-0606130 B1    7/2006

* cited by examiner

*Primary Examiner* — Helene E Tayong
(74) *Attorney, Agent, or Firm* — LRK PATENT LAW FIRM (57) ABSTRACT

A method and apparatus for compensating an in- and quadrature-(IQ) imbalance are disclosed. The method and apparatus for compensating an in- and quadrature-(IQ) imbalance provide a technique for compensating a signal distortion caused by imperfect element features and various noises on a transmission link in terahertz wireless communication and improving transmission performance.

19 Claims, 6 Drawing Sheets

METHOD AND APPARATUS FOR COMPENSATING IQ IMBALANCE

CROSS-REFERENCE TO RELATED APPLICATION(S)

This application claims the priority benefit of Korean Patent Application No. 10-2022-0038633 filed on Mar. 29, 2022, in the Korean Intellectual Property Office, the disclosure of which is incorporated herein by reference for all purposes.

BACKGROUND

1. Field of the Invention

One or more embodiments relate to a method and apparatus for compensating an in- and quadrature-(IQ) imbalance, and more particularly, a technique for compensating a signal distortion caused by imperfect element features and various noises on a transmission link in terahertz wireless communication and improving transmission performance.

2. Description of Related Art

Research on wireless communication technology using a terahertz (THz) frequency band (0.1 THz-10 THz) has been actively conducted because the wireless communication technology using the THz frequency band has the potential to significantly improve data transmission speed and transmission capacity compared to typical wireless communication technology using a millimeter frequency band. Specifically, THz wireless communication technology using a low-loss band is emerging as core technology for satisfying the requirements of sixth generation (6G) communication, which are a high-speed data capacity greater than or equal to 1 terabyte per second (TBps) and a low-latency condition less than or equal to 1 millisecond (ms).

A high-quality THz wireless signal generation function of a transmitter and a signal distortion compensation function of a receiver are highly important in order to increase a transmission distance of the THz wireless communication and the efficiency of costs and power consumption. Specifically, digital signal processing (DSP) technology for compensating a distorted signal from a received THz signal, restoring the phase and gain of the received THz signal, and accurately restoring data is the core of coherent THz wireless communication technology to which a high-level modulation method, such as quadrature phase shift keying (QPSK) and multilevel quadrature amplitude modulation (m-QAM) that are needed for large-capacity transmission, is applied.

However, coherent THz wireless communication technology using typical digital signal processing technology may not effectively remove phase noise caused by imperfect element features and various noises on a transmission link, and accordingly, an in- and quadrature-(IQ) imbalance in a phase and a gain may be caused. The IQ imbalance may limit the use of THz wireless communication technology for high-speed, large-capacity wireless communication technology for 6G communication.

SUMMARY

An aspect provides a method and apparatus for compensating an in- and quadrature-(IQ) imbalance, and more particularly, a method and apparatus for compensating an IQ gain imbalance through normalization and compensating the IQ phase imbalance by orthogonally separating a frequency component of an IQ imbalance signal and removing an interference component between an in-phase and a quadrature phase with respect to a signal distortion caused by imperfect element features and various noises on a transmission link in terahertz wireless communication.

According to an aspect, there is provided a method of compensating an IQ imbalance including removing noise of a high-frequency component from a terahertz signal by applying a low-pass filter to the terahertz signal shifting to a baseband; restoring a clock phase of the terahertz signal from which the noise of the high-frequency component is removed by compensating a frequency offset and phase noise that are estimated from a factor of the terahertz signal from which the noise of the high-frequency component is removed; restoring a carrier phase of the terahertz signal of which the clock phase is restored by tracking polarization coupling and phase fluctuation of the terahertz signal of which the clock phase is restored by using a feedback method and compensating phase noise; removing an IQ phase imbalance caused by residual phase noise of the terahertz signal of which the carrier phase is restored by removing an interference component between an in-phase signal and a quadrature signal after orthogonally separating a frequency component of the terahertz signal of which the carrier phase is restored; and compensating an IQ gain imbalance of the terahertz signal from which the IQ phase imbalance is removed through a normalization process by using a maximum value of the in-phase signal and the quadrature signal from which the IQ phase imbalance is removed.

The restoring the clock phase of the terahertz signal may include removing an impact of a modulation phase through multiplication of a terahertz signal in a complex number form; compensating a frequency offset estimated from a factor of the terahertz signal from which the impact of the modulation phase is removed; estimating phase noise caused by a residual frequency offset and a light source linewidth from a factor of the terahertz signal of which the frequency offset is compensated; and removing the phase noise caused by the residual frequency offset and the light source linewidth through multiplication of the terahertz signal of which the frequency offset is compensated.

The restoring the carrier phase of the terahertz signal may include an IQ phase configured to adjust a polarization separation ratio such that a crosstalk between the in-phase signal and the quadrature signal that are polarization-separated through the feedback method is minimized.

The removing the IQ phase imbalance may include orthogonally separating the frequency component after converting the terahertz signal of which the carrier phase is restored into a signal in a frequency domain and removing the interference component between the in-phase signal and the quadrature signal by applying different frequency conversion techniques, respectively, to a real number part and an imaginary number part.

The removing the interference component between the in-phase signal and the quadrature signal may include removing an interference component with a quadrature phase from the in-phase signal by applying Fourier cosine transformation to the real number part and removing an interference component with an in-phase from the quadrature signal by applying Fourier sine transformation to the imaginary number part.

The compensating the IQ gain imbalance may include estimating a gain of the in-phase signal and a gain of the quadrature signal by using the maximum value of the in-phase signal and the quadrature signal from which the IQ phase imbalance is removed and normalizing the estimated gain of the in-phase signal and the estimated gain of the quadrature signal.

The normalizing may include (i) normalizing the estimated gain of the in-phase signal by dividing the estimated gain of the in-phase signal by a gain of the same in-phase signal or multiplying the estimated gain of the in-phase signal by the estimated gain of the quadrature signal and (ii) normalizing the estimated gain of the quadrature signal by dividing the estimated gain of the quadrature signal by a gain of the same quadrature signal or multiplying the estimated gain of the quadrature signal by the estimated gain of the in-phase signal.

According to another aspect, there is provided a method of compensating an IQ imbalance including performing frequency conversion on a terahertz signal of a plurality of channels of which intermediate frequencies are different from one another; separating, by each intermediate frequency, the terahertz signal of the channels on which the frequency conversion is performed by applying a frequency pass filter of which a center frequency is the intermediate frequency to the terahertz signal of the channels on which the frequency conversion is performed; performing an inverse-frequency conversion on the terahertz signal of the channels that is separated by each intermediate frequency; removing noise of a high-frequency component by applying a low-pass filter to the terahertz signal of the channels on which the inverse-frequency conversion is performed and shifting to a baseband; restoring a clock phase of the terahertz signal from which the noise of the high-frequency component is removed by compensating a frequency offset and phase noise that are estimated from a factor of the terahertz signal from which the noise of the high-frequency component is removed; restoring a carrier phase of the terahertz signal of which the clock phase is restored by tracking polarization coupling and phase fluctuation of the terahertz signal of which the clock phase is restored by using a feedback method and compensating phase noise; removing an IQ phase imbalance caused by residual phase noise of the terahertz signal of which the carrier phase is restored by removing an interference component between an in-phase signal and a quadrature signal after orthogonally separating a frequency component of the terahertz signal of which the carrier phase is restored; and compensating an IQ gain imbalance of the terahertz signal from which the IQ phase imbalance is removed through a normalization process by using a maximum value of the in-phase signal and the quadrature signal from which the IQ phase imbalance is removed.

The restoring the clock phase of the terahertz signal may include removing an impact of a modulation phase through multiplication of a terahertz signal in a complex number form; compensating a frequency offset estimated from a factor of the terahertz signal from which the impact of the modulation phase is removed; estimating phase noise caused by a residual frequency offset and a light source linewidth from a factor of the terahertz signal of which the frequency offset is compensated; and removing the phase noise caused by the residual frequency offset and the light source linewidth through multiplication of the terahertz signal of which the frequency offset is compensated.

The restoring the carrier phase of the terahertz signal may include an IQ phase configured to adjust a polarization separation ratio such that a crosstalk between the in-phase signal and the quadrature signal that are polarization-separated through the feedback method is minimized.

The removing the IQ phase imbalance may include orthogonally separating the frequency component after converting the terahertz signal of which the carrier phase is restored into a signal in a frequency domain and removing the interference component between the in-phase signal and the quadrature signal by applying different frequency conversion techniques respectively to a real number part and an imaginary number part.

The removing the interference component between the in-phase signal and the quadrature signal may include removing an interference component with a quadrature phase from the in-phase signal by applying Fourier cosine transformation to the real number part and removing an interference component with an in-phase from the quadrature signal by applying Fourier sine transformation to the imaginary number part.

The compensating the IQ gain imbalance may include estimating a gain of the in-phase signal and a gain of the quadrature signal by using the maximum value of the in-phase signal and the quadrature signal from which the IQ phase imbalance is removed and normalizing the estimated gain of the in-phase signal and the estimated gain of the quadrature signal.

The normalizing may include (i) normalizing the estimated gain of the in-phase signal by dividing the estimated gain of the in-phase signal by a gain of the same in-phase signal or multiplying the estimated gain of the in-phase signal by the estimated gain of the quadrature signal and (ii) normalizing the estimated gain of the quadrature signal by dividing the estimated gain of the quadrature signal by a gain of the same quadrature signal or multiplying the estimated gain of the quadrature signal by the estimated gain of the in-phase signal.

According to another aspect, there is provided an apparatus for compensating an IQ imbalance including a processor, in which the processor is configured to remove the noise of a high-frequency component from a terahertz signal by applying a low-pass filter to the terahertz signal shifting to a baseband, restore a clock phase of the terahertz signal from which the noise of the high-frequency component is removed by compensating a frequency offset and phase noise that are estimated from a factor of the terahertz signal from which the noise of the high-frequency component is removed, restore a carrier phase of the terahertz signal of which the clock phase is restored by tracking polarization coupling and phase fluctuation of the terahertz signal of which the clock phase is restored by using a feedback method and compensating phase noise, remove an IQ phase imbalance caused by residual phase noise of the terahertz signal of which the carrier phase is restored by removing an interference component between an in-phase signal and a quadrature signal after orthogonally separating a frequency component of the terahertz signal of which the carrier phase is restored, and compensate an IQ gain imbalance of the terahertz signal from which the IQ phase imbalance is removed through a normalization process by using a maximum value of the in-phase signal and the quadrature signal from which the IQ phase imbalance is removed.

The processor may restore the clock phase of the terahertz signal by removing an impact of a modulation phase through multiplication of a terahertz signal in a complex number form, compensate a frequency offset estimated from a factor of the terahertz signal from which the impact of the modulation phase is removed, estimate phase noise caused by a residual frequency offset and a light source linewidth from a factor of the terahertz signal of which the frequency offset is compensated, and remove the phase noise caused by the residual frequency offset and the light source linewidth through multiplication of the terahertz signal of which the frequency offset is compensated.

The processor may restore the carrier phase of the terahertz signal by adjusting a polarization separation ratio such that a crosstalk between the in-phase signal and the quadrature signal that are polarization-separated through the feedback method is minimized.

The processor may remove the IQ phase imbalance by orthogonally separating the frequency component after converting the terahertz signal of which the carrier phase is restored into a signal in a frequency domain, remove an interference component with a quadrature phase from the in-phase signal by applying Fourier cosine transformation to the real number part, and remove an interference component with an in-phase from the quadrature signal by applying Fourier sine transformation to the imaginary number part.

The processor may estimate a gain of the in-phase signal and a gain of the quadrature signal by using the maximum value of the in-phase signal and the quadrature signal from which the IQ phase imbalance is removed, normalize the estimated gain of the in-phase signal by dividing the estimated gain of the in-phase signal by a gain of the same in-phase signal or multiplying the estimated gain of the in-phase signal by the estimated gain of the quadrature signal, and normalize the estimated gain of the quadrature signal by dividing the estimated gain of the quadrature signal by a gain of the same quadrature signal or multiplying the estimated gain of the quadrature signal by the estimated gain of the in-phase signal.

According to another aspect, a signal distortion caused by imperfect element features and various noises on a transmission link in terahertz wireless communication technology may be solved by orthogonally separating a frequency component of in-phase and quadrature signals, removing an interference component between the in-phase and quadrature signals, and compensating an IQ imbalance.

According to another aspect, the performance of coherent terahertz wireless communication technology may be improved by compensating an IQ imbalance.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, embodiments are described in detail with reference to the accompanying drawings.

Figure 1:
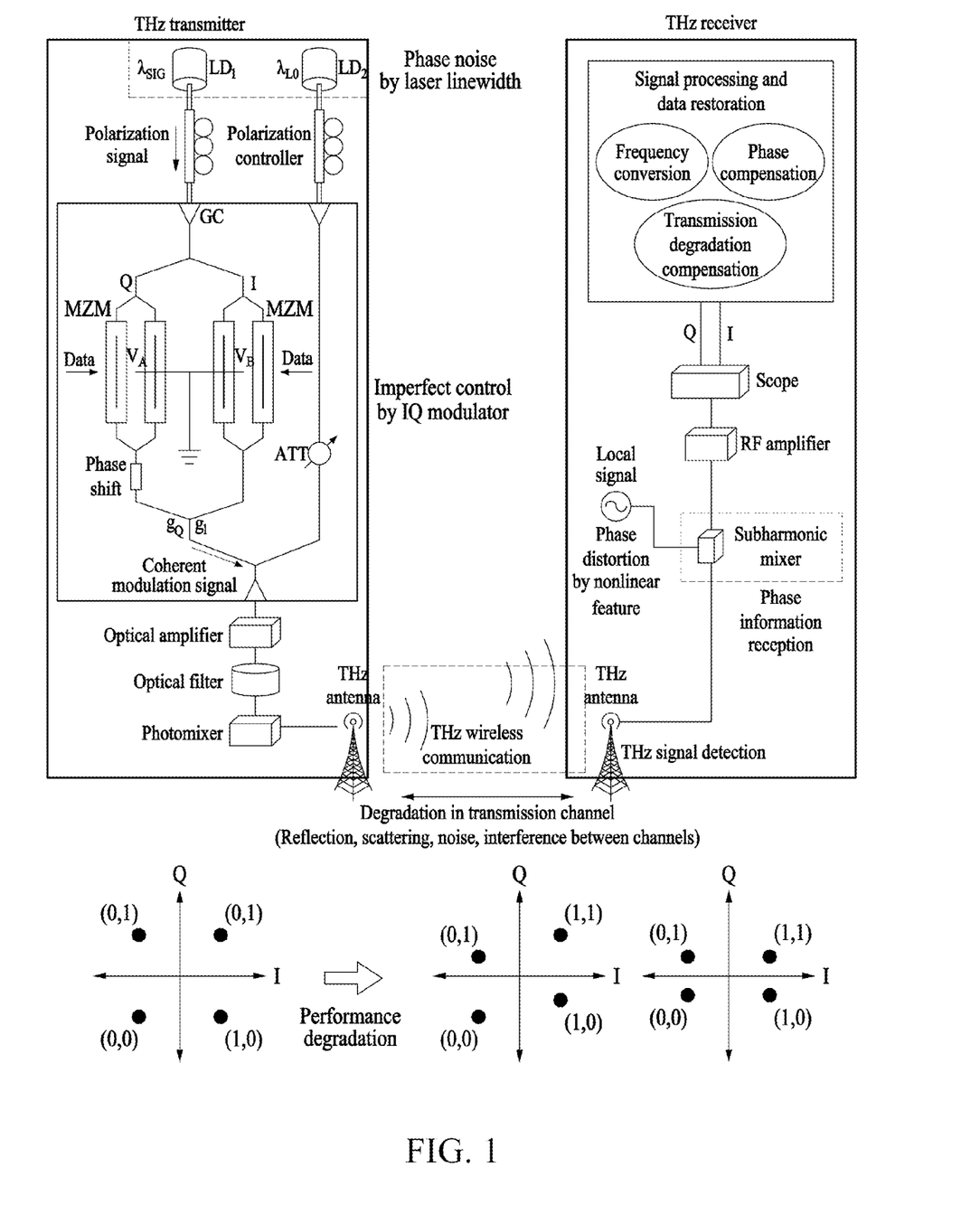
FIG. 1 is a diagram illustrating a cause of an in- and quadrature-(IQ) imbalance and the resultant performance degradation in coherent terahertz wireless communication technology using a dual-parallel Mach-Zehnder modulator, according to an embodiment.

FIG. 1 is a diagram illustrating a cause of an in- and quadrature-(IQ) imbalance and the resultant performance degradation in coherent terahertz wireless communication technology using a dual-parallel Mach-Zehnder modulator, according to an embodiment.

Referring to FIG. 1, the coherent terahertz (THz) wireless communication technology may include a THz transmitter for transmitting a THz signal and a THz receiver for receiving the THz signal transmitted through a wireless transmission channel. Hereinafter, the THz signal transmitted by the THz transmitter may be referred to as a transmission signal and the THz signal received by the THz receiver may be referred to as a reception signal.

The THz transmitter may efficiently transmit digital data by converting the digital data into a high-quality transmission signal by using a high-level IQ modulation method. More specifically, the THz transmitter may combine, into one, a local signal $\lambda_{LO}$ in a continuous wave (CW) form and a modulated signal $\lambda_{SIG}$ of a quadrature phase shift keying (QPSK) type by using the dual-parallel Mach-Zehnder modulator.

Then, the THz transmitter may amplify the intensity of a combined signal through an optical amplifier, remove amplified spontaneous emission (ASE) noise of the optical amplifier through a wideband filter, transmit the combined signal to a photomixer, and generate a transmission signal. In this case, the photomixer may generate a transmission signal having a THz frequency corresponding to a frequency difference between the modulated signal $\lambda_{SIG}$ and the local signal $\lambda_{LO}$.

In addition, the THz receiver may detect, in a coherent manner, a transmission signal that is wirelessly transmitted, accurately restore phase information of the transmitted transmission signal, and receive digital data without errors.

The THz receiver may detect, in a coherent manner, a transmission signal that is transmitted to a free space by using an electronic local oscillator-based sub-harmonic mixer and convert the transmission signal into a transmission signal of an intermediate frequency. The THz receiver may accurately restoring digital data included in the transmission signal without errors by finding out phase information of the transmission signal by using digital signal processing technology after collecting the transmission signal converted into the transmission signal of the intermediate frequency with a real-time scope.

However, in the coherent THz wireless communication technology, the intensity of the transmission signal transmitted by the THz transmitter may decrease and the phase information of the transmission signal may be distorted because of various noises generated in a transmission environment. In addition, a phase of the transmission signal may not be readily restored from a reception signal because of a limited bandwidth of an element used in the THz receiver and a nonlinear feature thereof, and thus, transmission performance may be degraded.

There may be four main causes of transmission performance degradation. A first factor may be phase noise caused by a broad laser linewidth. The phase noise may be generated when the linewidth of a laser, that is, a light source used to generate a THz signal, is broad. Because of the phase noise, the digital signal processing technology of the THz receiver may not accurately restore the transmission signal from the reception signal, and the restored transmission signal may be distorted, causing a phase imbalance and a gain imbalance.

A second factor may be a signal distortion caused by imperfect control of an IQ modulator. A Mach-Zehnder-type IQ modulator may be used for high-speed data transmission. When a driving voltage of the IQ modulator and a phase shifter are not precisely controlled, the modulated signal may suffer from an IQ imbalance. The precise control of such a modulator may be more difficult in a higher-level modulation type, and a signal may be more easily distorted therein.

A third factor may be a signal distortion caused by degradation in a transmission channel. In a wireless transmission environment, a signal may be distorted by a signal attenuation caused by reflection or scattering, thermal noise, intermodulation noise, signal interference between channels, and impulse noise, and such a signal distortion may cause an IQ imbalance. A signal attenuation in a free space may increase as a wireless link distance increases. The degree of attenuation may increase as a frequency increases as shown in Equation 1, and a signal may be distorted.

$$\frac{P_t}{P_r} = \frac{(4\pi f d)^2}{c^2} \qquad \text{<Equation 1>}$$

Here, $P_t$ denotes the intensity of a transmission signal transmitted through a THz antenna, $P_r$ denotes the intensity of a reception signal received through a THz antenna, f denotes a carrier frequency, d denotes a transmission distance, and c denotes a speed of light.

In addition, thermal noise caused by the thermal agitation of the electrons inside electrical devices and transmission medium may be uniformly distributed regardless of frequencies, and intermodulation noise is spurious frequency component generated when signals having different frequencies from one another share the same medium, a crosstalk caused when signals between channels are combined together, and impulse noise caused by an electromagnetic wave interference may be major noise that distorts a signal.

A fourth factor may be a phase distortion caused by a nonlinear feature of a receiver. A signal distortion caused by a nonlinear feature of an element, such as a subharmonic mixer, may affect performance more as a transmission speed increases.

The performance of digital signal processing technology for restoring the phase and gain of a transmission signal from a reception signal distorted by various noises may be highly important in determining a transmission distance of a THz wireless communication system, a transmission speed of the THz wireless communication system, and a transmission capacity of the THz wireless communication system.

Therefore, the present disclosure may propose a method of improving transmission performance by removing phase noise of a phase-modulated coherent THz signal and solving an IQ imbalance issue.

Figure 2:
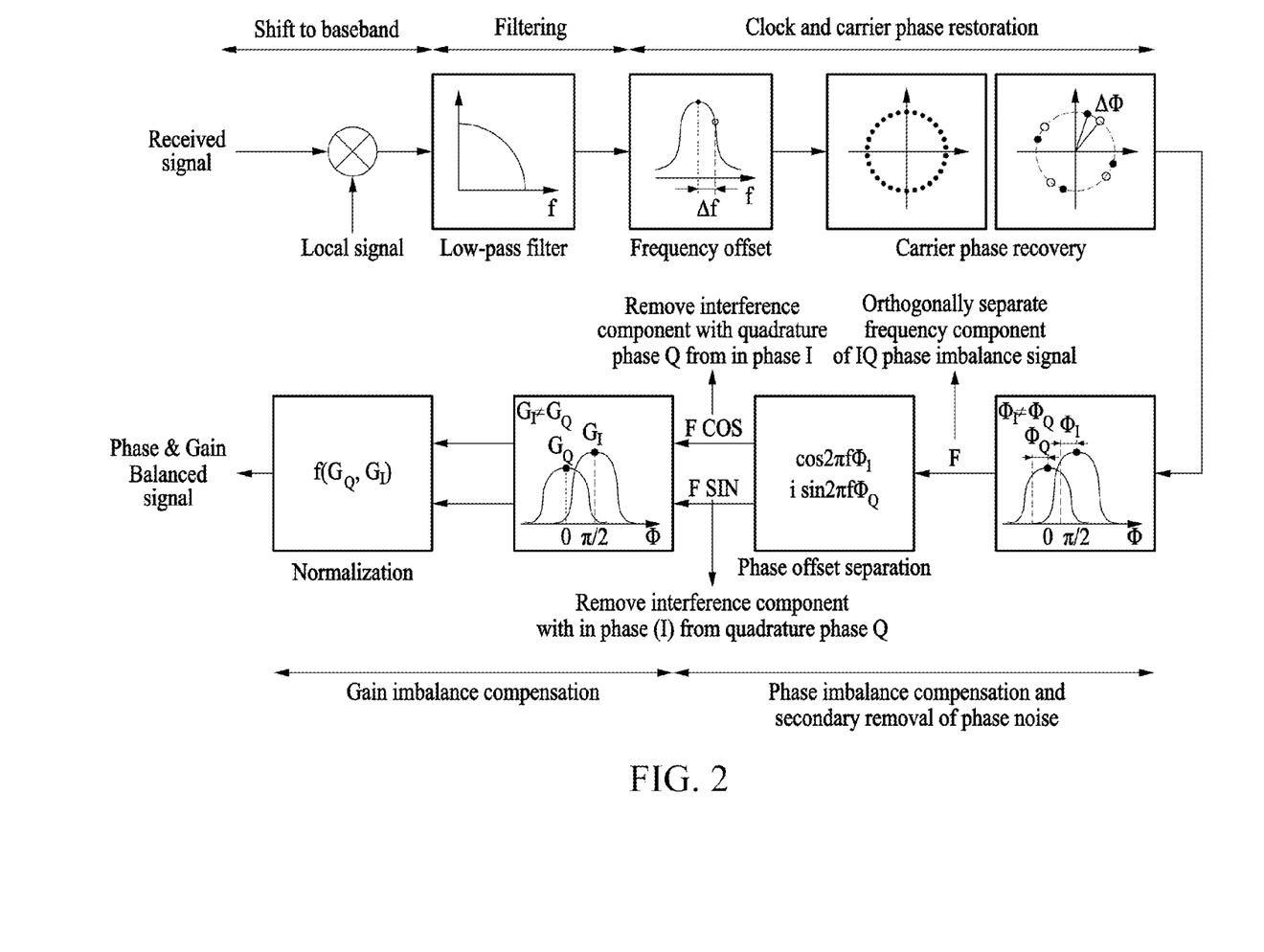
FIG. 2 is a diagram illustrating a method of removing phase noise and compensating an IQ imbalance performed by an IQ imbalance compensation device, according to an embodiment.

FIG. 2 is a diagram illustrating a method of removing phase noise and compensating an IQ imbalance performed by an IQ imbalance compensation device, according to an embodiment.

First, in FIG. 2, $\Delta f$ denotes a frequency offset, $\Delta\Phi$ denotes residual phase noise, $\Phi_I$ denotes an in-phase offset, $\Phi_Q$ denotes a quadrature offset, F denotes Fourier transformation, F COS denotes Fourier cosine transformation, F SIN denotes Fourier sine transformation, $G_I$ denotes an in-phase gain, and $G_Q$ denotes a quadrature gain.

The IQ imbalance compensation device corresponding to a digital signal processor (DPS) included by a THz receiver may remove the noise of a high-frequency component by applying a low-pass filter after shifting a reception signal to a baseband. The IQ imbalance compensation device may restore a clock phase of the reception signal by compensating the phase noise and a frequency offset that are estimated from a factor of a complex number, that is, the reception signal from which the noise of the high-frequency component is removed, and may restore a carrier phase of the reception signal of which the clock phase is restored by tracking, in a feedback method, the polarization coupling and phase fluctuation of the reception signal of which the clock phase is restored and compensating phase noise.

Then, the IQ imbalance compensation device may remove an IQ phase imbalance caused by the residual phase noise of the reception signal of which the carrier phase is restored by removing an interference component between an in-phase signal and a quadrature signal after orthogonally separating a frequency component of the reception signal of which the carrier phase is restored.

Lastly, the IQ imbalance compensation device may compensate an IQ gain imbalance of the reception signal from which the IQ phase imbalance is removed through a normalization process by using a maximum value of the in-phase signal and the quadrature signal from which the IQ phase imbalance is removed.

Figure 3:
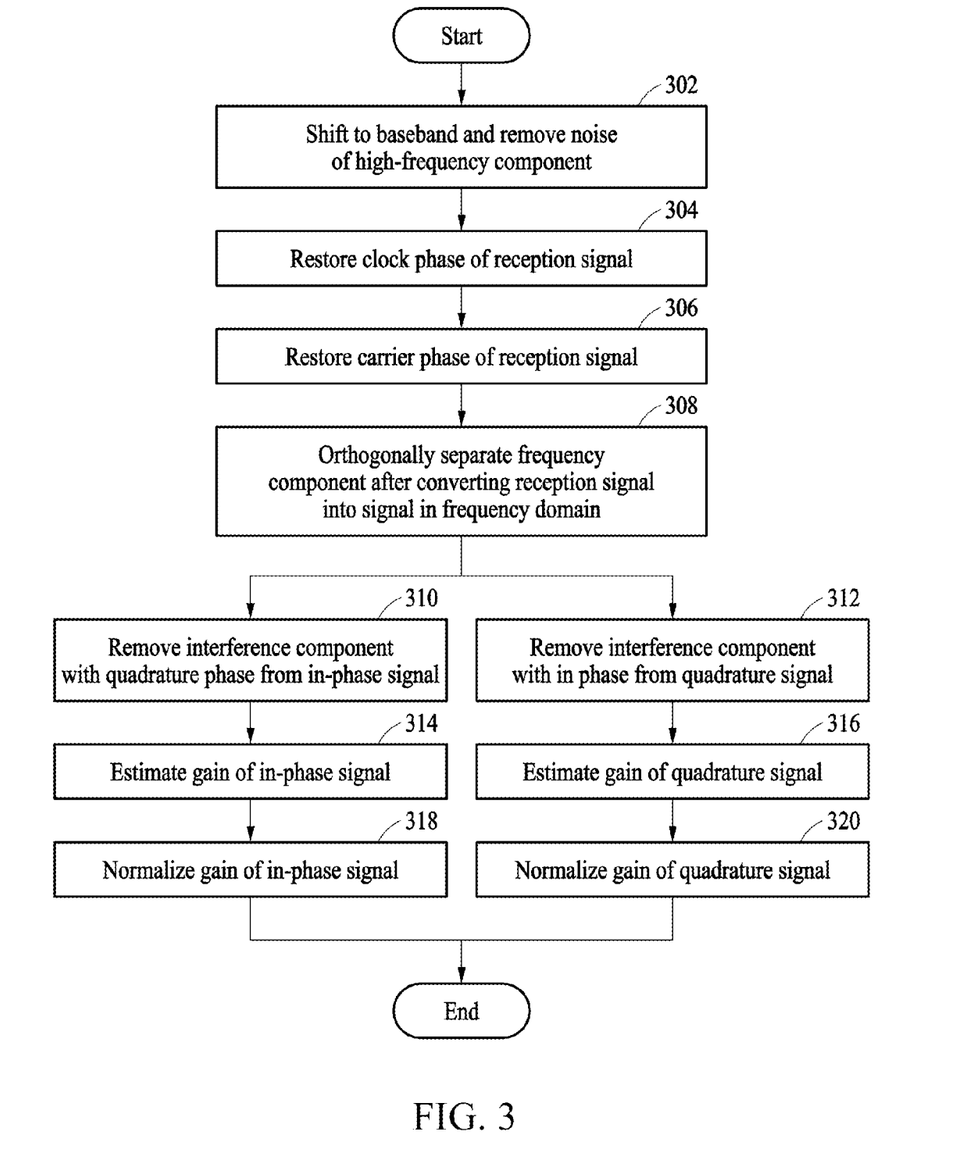
FIG. 3 is a diagram illustrating a detailed procedure of a method of removing phase noise and compensating an IQ imbalance performed by an IQ imbalance compensation device, according to an embodiment.

FIG. 3 is a diagram illustrating a detailed procedure of a method of removing phase noise and compensating an IQ imbalance performed by an IQ imbalance compensation device, according to an embodiment.

In operation 302, the IQ imbalance compensation device may remove the noise of a high-frequency component by filtering a reception signal through a low-pass filter after shifting the reception signal having a carrier frequency to a baseband.

In operation 304, the IQ imbalance compensation device may restore a clock phase of the reception signal from which the noise of the high-frequency component is removed. More specifically, the IQ imbalance compensation device may remove phase noise caused by the fluctuation of a modulation phase by multiplying a reception signal S(k) from which the noise of the high-frequency component is removed by a neighboring reception signal S(k−1) temporally consecutive to the reception signal S(k) and raising an obtained value to the fourth power. Because a change of the modulation phase with respect to time is very small, the change may get negligibly small when multiplying the reception signal S(k) by the neighboring reception signal S(k−1) and raising the obtained value to the fourth power, and the phase noise caused by the change of the modulation phase may be removed.

Then, the IQ imbalance compensation device may obtain a reception signal S'(k) of which a frequency offset is compensated as shown in Equation 2 by compensating the frequency offset Δ that is estimated from a factor of the reception signal from which the phase noise caused by the modulation phase is removed.

<Equation 2>
$$S(k) = e^{j(\theta_s(k)+\Delta\omega kT+\theta_L(k)+\theta_{ASE}(k))}$$

$$S(k) \cdot S(k-1) \cong e^{j(\theta_s(k)+\Delta\omega kT+\theta_{ASE}(k))}$$

$$S(k) \cdot S(k-1)^4 = e^{4\times j(\theta_s(k)+\Delta\omega kT+\theta_{ASE}(k))} \cong e^{4\times j(\Delta\omega kT+\theta_{ASE}(k))}$$

$$\sum_N S(k) \cdot S(k-1)^4 \cong e^{4\times j(\Delta\omega kT)}$$

$$\frac{\arg\left(\sum_N S(k) \cdot S(k-1)^4\right)}{4} = \Delta\omega kT$$

$$S'(k) = S(k) \cdot e^{-j\Delta\omega kT}$$

The IQ imbalance compensation device may remove phase noise caused by a light source linewidth and a residual frequency offset in a reception signal S'(k) of which the frequency offset is compensated by obtaining a factor after raising the reception signal S'(k) of which the frequency offset is compensated to the fourth power and may obtain a reception signal S''(k) of which the clock phase is restored as shown in Equation 3.

<Equation 3>
$$S'(k) = e^{j(\theta_s(k)+\theta_L(k)+\theta_{ASE}(k))}$$

$$S'(k)^4 = e^{4\times j(\theta_s(k)+\theta_L(k)+\theta_{ASE}(k))} \cong e^{4\times j(\theta_L(k)+\theta_{ASE}(k))}$$

$$\sum_N S'(k)^4 \cong e^{4\times j(\theta_L(k))}$$

$$\frac{\arg\left(\sum_N S'(k)^4\right)}{4} = \theta_L(k)$$

$$S''(k) = S'(k) \cdot e^{-j\theta_L}$$

In operation 306, the IQ imbalance compensation device may restore a carrier phase of the reception signal S''(k) of which the clock phase is restored. More specifically, the IQ imbalance compensation device may remove phase noise caused by phase fluctuation with respect to time and a crosstalk by coupling between polarization-separated signals by adjusting a polarization separation ratio of the reception signal of which the clock phase is restored by using a feedback method, and may restore the carrier phase of the reception signal. In this case, the IQ imbalance compensation device may adjust the polarization separation ratio through a feedback method such that the crosstalk between the polarization-separated signals may be minimized.

In operation 308, the IQ imbalance compensation device may orthogonally separate a frequency component after converting the reception signal of which the carrier phase is restored by applying Fourier transformation thereto into a signal in a frequency domain in order to remove an IQ phase imbalance caused by still remaining residual phase noise.

Then, the IQ imbalance compensation device may remove, in operation 310, an interference component with a quadrature phase from an in-phase signal by applying Fourier cosine transformation to a real number part and may remove, in operation 312, the IQ phase imbalance caused by the residual phase noise by removing an interference component with an in-phase from a quadrature signal by applying Fourier sine transformation to an imaginary number part.

The IQ imbalance compensation device may estimate, in operation 314, a gain of the in-phase signal by using a maximum value of the in-phase signal from which the IQ phase imbalance is removed and may estimate, in operation 316, a gain of the quadrature signal by using a maximum value of the quadrature signal from which the IQ phase imbalance is removed.

In operation 318, the IQ imbalance compensation device may normalize the estimated gain of the in-phase signal by dividing the estimated gain of the in-phase signal by a gain of the same in-phase signal or multiplying the estimated gain of the in-phase signal by the estimated gain of the quadrature signal.

Lastly, in operation 320, the IQ imbalance compensation device may normalize the estimated gain of the quadrature signal by dividing the estimated gain of the quadrature signal by a gain of the same quadrature signal or multiplying the estimated gain of the quadrature signal by the estimated gain of the in-phase signal, and may compensate an IQ gain imbalance.

Figure 4:
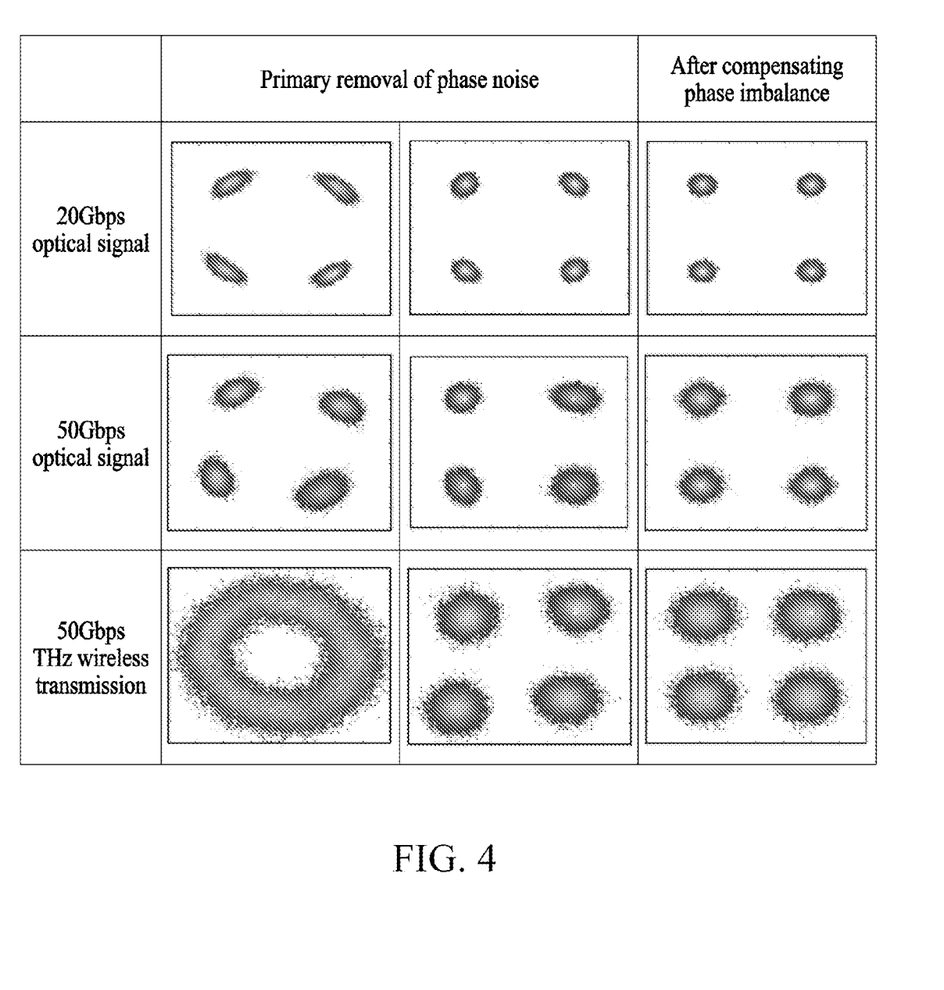
FIG. 4 is a diagram illustrating an experiment result of verifying an effect of an IQ imbalance compensation method, according to an embodiment.

FIG. 4 is a diagram illustrating an effect of an IQ imbalance compensation method, according to an embodiment.

FIG. 4 illustrates a THz signal restored by applying digital signal processing technology implemented as the IQ imbalance compensation method proposed in the present disclosure after wirelessly transmitting a THz signal modulated to a QPSK signal at a speed of 50 gigabytes per second (Gbps).

As illustrated in FIG. 4, residual phase noise may remain in a constellation after primarily removing phase noise through an operation of restoring clock and carrier phases with respect to optical signals respectively modulated to QPSK signals at a speed of 20 Gbps and 50 Gbps.

However, the residual phase noise may be completely removed after an operation of compensating an IQ phase imbalance and an IQ gain imbalance, and an accurate constellation may be restored. Such an effect may be clearly verified in a 50 Gbps THz wireless transmission experiment result.

Figure 5:
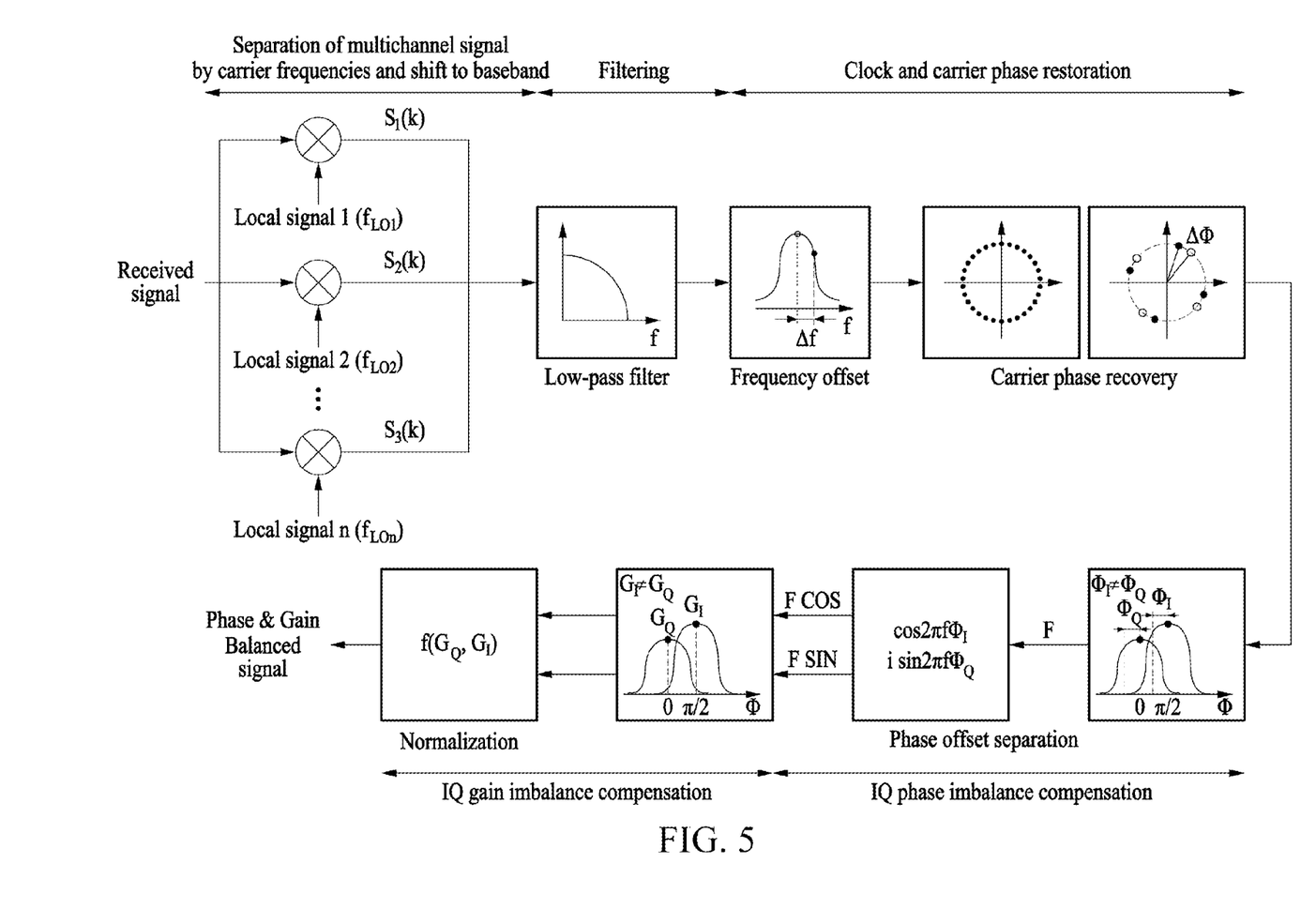
FIG. 5 is a diagram illustrating a method of removing phase noise and compensating an IQ imbalance performed by an IQ imbalance compensation device in a multichannel wireless transmission environment, according to an embodiment.

FIG. 5 is a diagram illustrating a method of removing phase noise and compensating an IQ imbalance performed by an IQ imbalance compensation device in a multichannel wireless transmission environment, according to an embodiment.

Referring to FIG. 5, the IQ imbalance compensation method performed by the IQ imbalance compensation device in the present disclosure may be widely applicable in a multichannel wireless transmission environment in which carrier frequencies are different from one another. More specifically, the IQ imbalance compensation device may separate a multichannel signal to signals respectively having different carrier frequencies by using local signals of which frequencies are different from one another as illustrated in FIG. 5. The IQ imbalance compensation device may shift the separated signals to a baseband and apply the method of removing the phase noise and compensating the IQ imbalance thereto as described with reference to FIG. 2.

Figure 6:
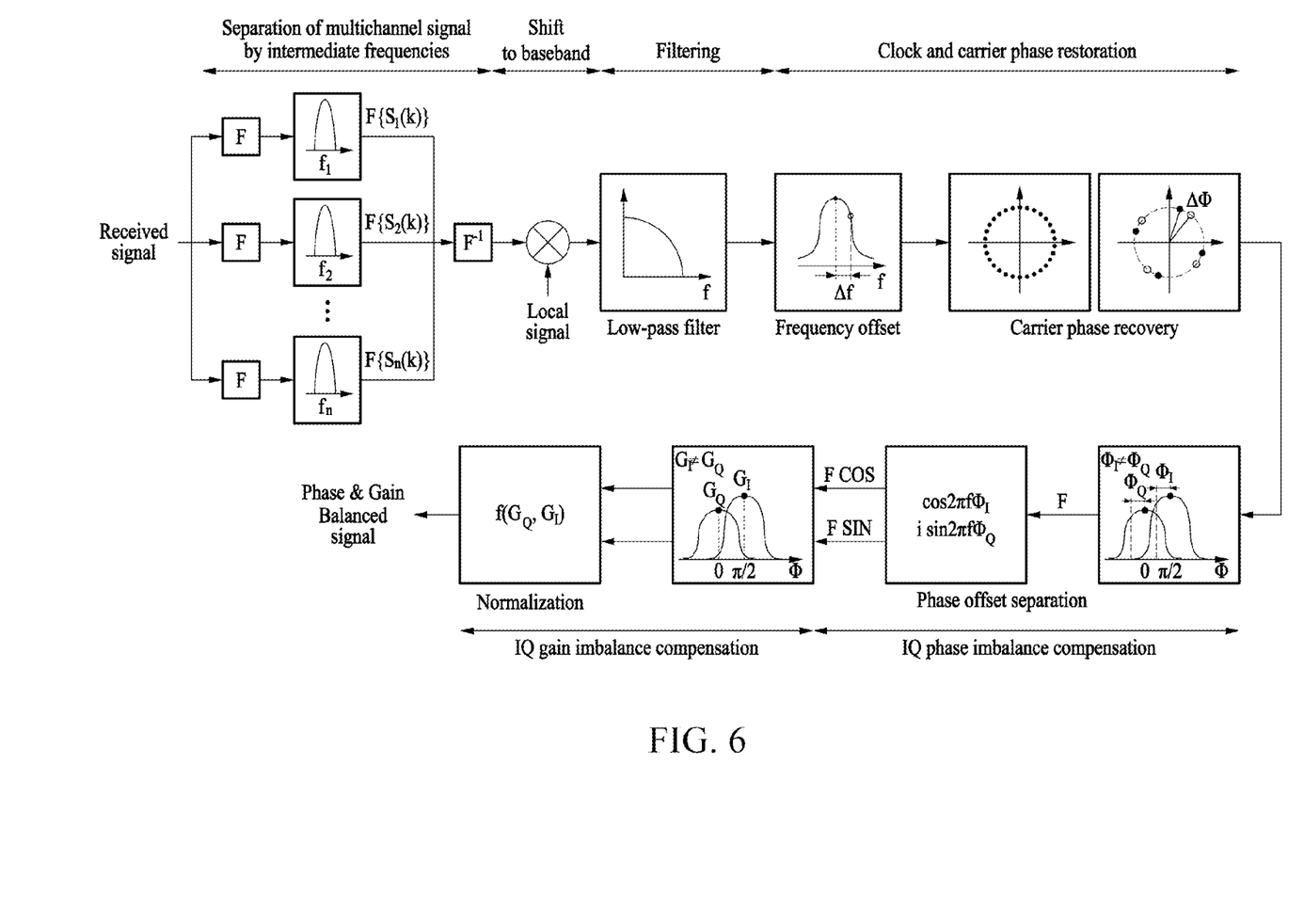
FIG. 6 is a diagram illustrating a method of removing phase noise and compensating an IQ phase imbalance performed by an IQ phase imbalance compensation device in a multichannel wireless transmission environment in which intermediate frequencies are different from one another, according to an embodiment.

FIG. 6 is a diagram illustrating a method of removing phase noise and compensating an IQ phase imbalance performed by an IQ phase imbalance compensation device in a multichannel wireless transmission environment in which intermediate frequencies are different from one another, according to an embodiment.

Referring to FIG. 6, the IQ imbalance compensation method performed by the IQ imbalance compensation device in the present disclosure may be widely applicable in the multichannel wireless transmission environment in which intermediate frequencies are different from one another. More specifically, the IQ imbalance compensation device may apply Fourier transformation to a multichannel signal of which intermediate frequencies are different from one another and transform the multichannel signal to a frequency domain as illustrated in FIG. 6.

Then, the IQ imbalance compensation device may separate the multichannel signal by using a bandpass filter of which a center frequency is a frequency corresponding to an intermediate frequency and return the separated signals to signals in a time domain by performing inverse Fourier transformation. The IQ imbalance compensation device may shift the signals separated by channels according to intermediate frequencies to a baseband, and then, may apply the method of removing the phase noise and compensating the IQ imbalance thereto as described with reference to FIG. 2.

The method according to embodiments may be written in a computer-executable program and may be implemented as various recording media, such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to one of ordinary skill in the art that various modifications based on the technical spirit of the present disclosure, as well as the disclosed embodiments, can be made.

What is claimed is:

1. A method of compensating an in- and quadrature-(IQ) imbalance, the method comprising:
   removing noise of a high-frequency component from a terahertz signal by applying a low-pass filter to the terahertz signal shifting to a baseband;
   restoring a clock phase of the terahertz signal from which the noise of the high-frequency component is removed by compensating a frequency offset and phase noise that are estimated from a factor of the terahertz signal from which the noise of the high-frequency component is removed;
   restoring a carrier phase of the terahertz signal of which the clock phase is restored by tracking polarization coupling and phase fluctuation of the terahertz signal of which the clock phase is restored by using a feedback method and compensating phase noise;
   removing an IQ phase imbalance caused by residual phase noise of the terahertz signal of which the carrier phase is restored by removing an interference component between an in-phase signal and a quadrature signal after orthogonally separating a frequency component of the terahertz signal of which the carrier phase is restored; and compensating an IQ gain imbalance of the terahertz signal from which the IQ phase imbalance is removed through a normalization process by using a maximum value of the in-phase signal and the quadrature signal from which the IQ phase imbalance is removed.

2. The method of claim 1, wherein the restoring the clock phase of the terahertz signal comprises:

removing an impact of a modulation phase through multiplication of the terahertz signal in a complex number form;

compensating a frequency offset estimated from a factor of the terahertz signal from which the impact of the modulation phase is removed;

estimating phase noise caused by a residual frequency offset and a light source linewidth from a factor of the terahertz signal of which the frequency offset is compensated; and removing the phase noise caused by the residual frequency offset and the light source linewidth through multiplication of the terahertz signal of which the frequency offset is compensated.

3. The method of claim 1, wherein the restoring the carrier phase of the terahertz signal comprises:

an IQ phase configured to adjust a polarization separation ratio such that a crosstalk between the in-phase signal and the quadrature signal that are polarization-separated through the feedback method is minimized.

4. The method of claim 1, wherein the removing the IQ phase imbalance comprises:

orthogonally separating the frequency component after converting the terahertz signal of which the carrier phase is restored into a signal in a frequency domain; and removing the interference component between the in-phase signal and the quadrature signal by applying different frequency conversion techniques respectively to a real number part and an imaginary number part.

5. The method of claim 4, wherein the removing the interference component between the in-phase signal and the quadrature signal comprises:

removing an interference component with a quadrature phase from the in-phase signal by applying Fourier cosine transformation to the real number part; and removing an interference component with an in-phase from the quadrature signal by applying Fourier sine transformation to the imaginary number part.

6. The method of claim 1, wherein the compensating the IQ gain imbalance comprises:

estimating a gain of the in-phase signal and a gain of the quadrature signal by using the maximum value of the in-phase signal and the quadrature signal from which the IQ phase imbalance is removed; and normalizing the estimated gain of the in-phase signal and the estimated gain of the quadrature signal.

7. The method of claim 6, wherein the normalizing comprises:

(i) normalizing the estimated gain of the in-phase signal by dividing the estimated gain of the in-phase signal by a gain of the same in-phase signal or multiplying the estimated gain of the in-phase signal by the estimated gain of the quadrature signal; and (ii) normalizing the estimated gain of the quadrature signal by dividing the estimated gain of the quadrature signal by a gain of the same quadrature signal or multiplying the estimated gain of the quadrature signal by the estimated gain of the in-phase signal.

8. A method of compensating an in- and quadrature (IQ) imbalance, the method comprising:

performing frequency conversion on a terahertz signal of a plurality of channels of which intermediate frequencies are different from one another;

separating, by each intermediate frequency, the terahertz signal of the channels on which the frequency conversion is performed by applying a frequency pass filter of which a center frequency is the intermediate frequency to the terahertz signal of the channels on which the frequency conversion is performed;

performing an inverse-frequency conversion on the terahertz signal of the channels that is separated by each intermediate frequency;

removing noise of a high-frequency component by applying a low-pass filter to the terahertz signal of the channels, on which the inverse-frequency conversion is performed, shifting to a baseband;

restoring a clock phase of the terahertz signal from which the noise of the high-frequency component is removed by compensating a frequency offset and phase noise that are estimated from a factor of the terahertz signal from which the noise of the high-frequency component is removed;

restoring a carrier phase of the terahertz signal of which the clock phase is restored by tracking polarization coupling and phase fluctuation of the terahertz signal of which the clock phase is restored by using a feedback method and compensating phase noise;

removing an IQ phase imbalance caused by residual phase noise of the terahertz signal of which the carrier phase is restored by removing an interference component between an in-phase signal and a quadrature signal after orthogonally separating a frequency component of the terahertz signal of which the carrier phase is restored; and compensating an IQ gain imbalance of the terahertz signal from which the IQ phase imbalance is removed through a normalization process by using a maximum value of the in-phase signal and the quadrature signal from which the IQ phase imbalance is removed.

9. The method of claim 8, wherein the restoring the clock phase of the terahertz signal comprises:

removing an impact of a modulation phase through multiplication of the terahertz signal in a complex number form;

compensating a frequency offset estimated from a factor of the terahertz signal from which the impact of the modulation phase is removed;

estimating phase noise caused by a residual frequency offset and a light source linewidth from a factor of the terahertz signal of which the frequency offset is compensated; and removing the phase noise caused by the residual frequency offset and the light source linewidth through multiplication of the terahertz signal of which the frequency offset is compensated.

10. The method of claim 8, wherein the restoring the carrier phase of the terahertz signal comprises:

an IQ phase configured to adjust a polarization separation ratio such that a crosstalk between the in-phase signal and the quadrature signal that are polarization-separated through the feedback method is minimized.

11. The method of claim 8, wherein the removing the IQ phase imbalance comprises:

orthogonally separating the frequency component after converting the terahertz signal of which the carrier phase is restored into a signal in a frequency domain; and removing the interference component between the in-phase signal and the quadrature signal by applying different frequency conversion techniques respectively to a real number part and an imaginary number part.

12. The method of claim 11, wherein the removing the interference component between the in-phase signal and the quadrature signal comprises:

removing an interference component with a quadrature phase from the in-phase signal by applying Fourier cosine transformation to the real number part; and removing an interference component with an in-phase from the quadrature signal by applying Fourier sine transformation to the imaginary number part.

13. The method of claim 8, wherein the compensating the IQ gain imbalance comprises:

estimating a gain of the in-phase signal and a gain of the quadrature signal by using the maximum value of the in-phase signal and the quadrature signal from which the IQ phase imbalance is removed; and normalizing the estimated gain of the in-phase signal and the estimated gain of the quadrature signal.

14. The method of claim 13, wherein the normalizing comprises:

(i) normalizing the estimated gain of the in-phase signal by dividing the estimated gain of the in-phase signal by a gain of the same in-phase signal or multiplying the estimated gain of the in-phase signal by the estimated gain of the quadrature signal; and (ii) normalizing the estimated gain of the quadrature signal by dividing the estimated gain of the quadrature signal by a gain of the same quadrature signal or multiplying the estimated gain of the quadrature signal by the estimated gain of the in-phase signal.

15. An apparatus for compensating an in- and quadrature-(IQ) imbalance, the apparatus comprising:

a processor, wherein the processor is configured to:

remove noise of a high-frequency component from a terahertz signal by applying a low-pass filter to the terahertz signal shifting to a baseband, restore a clock phase of the terahertz signal from which the noise of the high-frequency component is removed by compensating a frequency offset and phase noise that are estimated from a factor of the terahertz signal from which the noise of the high-frequency component is removed, restore a carrier phase of the terahertz signal of which the clock phase is restored by tracking polarization coupling and phase fluctuation of the terahertz signal of which the clock phase is restored by using a feedback method and compensating phase noise, remove an IQ phase imbalance caused by residual phase noise of the terahertz signal of which the carrier phase is restored by removing an interference component between an in-phase signal and a quadrature signal after orthogonally separating a frequency component of the terahertz signal of which the carrier phase is restored, and compensate an IQ gain imbalance of the terahertz signal from which the IQ phase imbalance is removed through a normalization process by using a maximum value of the in-phase signal and the quadrature signal from which the IQ phase imbalance is removed.

16. The apparatus of claim 15, wherein the processor is configured to:

restore the clock phase of the terahertz signal by removing an impact of a modulation phase through multiplication of the terahertz signal in a complex number form, compensate a frequency offset estimated from a factor of the terahertz signal from which the impact of the modulation phase is removed, estimate phase noise caused by a residual frequency offset and a light source linewidth from a factor of the terahertz signal of which the frequency offset is compensated, and remove the phase noise caused by the residual frequency offset and the light source linewidth through multiplication of the terahertz signal of which the frequency offset is compensated.

17. The apparatus of claim 15, wherein the processor is configured to:

restore the carrier phase of the terahertz signal by adjusting a polarization separation ratio such that a crosstalk between the in-phase signal and the quadrature signal that are polarization-separated through the feedback method is minimized.

18. The apparatus of claim 15, wherein the processor is configured to:

remove the IQ phase imbalance by orthogonally separating the frequency component after converting the terahertz signal of which the carrier phase is restored into a signal in a frequency domain, remove an interference component with a quadrature phase from the in-phase signal by applying Fourier cosine transformation to the real number part, and remove an interference component with an in-phase from the quadrature signal by applying Fourier sine transformation to the imaginary number part.

19. The apparatus of claim 15, wherein the processor is configured to:

estimate a gain of the in-phase signal and a gain of the quadrature signal by using the maximum value of the in-phase signal and the quadrature signal from which the IQ phase imbalance is removed, normalize the estimated gain of the in-phase signal by dividing the estimated gain of the in-phase signal by a gain of the same in-phase signal or multiplying the estimated gain of the in-phase signal by the estimated gain of the quadrature signal, and normalize the estimated gain of the quadrature signal by dividing the estimated gain of the quadrature signal by a gain of the same quadrature signal or multiplying the estimated gain of the quadrature signal by the estimated gain of the in-phase signal.

* * * * *